Patented Dec. 9, 1941

2,265,230

UNITED STATES PATENT OFFICE 2,265,230

BASIC LEAD STYPHNATE AND A PROCESS OF MAKING IT

Aaron L. Hitchens, Jr., Alton, Ill., and Frederick M. Garfield, St. Louis, Mo., assignors to Western Cartridge Company, East Alton, Ill., a corporation of Delaware No Drawing. Application November 25, 1938, Serial No. 242,360

12 Claims. (Cl. 260—435)

This invention relates to a new crystalline basic lead trinitroresorcinate and a process of making it.

Basic lead trinitroresorcinate, generally termed basic lead styphnate, having a composition corresponding to the empirical formula $C_6H_3N_3O_{10}Pb_2$, has heretofore been described in the technical and patent literature, in the form of yellow and red solids. The former exists as a bulky material, consisting of exceedingly small particles, which may be prepared by the interaction of a solution of a lead salt with an alkaline solution of a styphnate, while the preparation of the latter as red diamond-shape crystals is described in U. S. Patent 1,942,274 to Brun as resulting from the addition of a solution containing sodium styphnate and sodium hydroxide to a lead nitrate solution under specified conditions.

The basic lead styphnate in accordance with our invention differs in physical and explosive properties from the prior types so as to overcome their inherent disadvantages and to be better suited for use in explosive and deflagrating compositions. Our new explosive consists of yellow to tan-yellow orthorhombic crystals, generally in the form of tabular rectangular parallelopipeds, which in the dry state are more desirably sensitive to frictional impact, have a higher apparent density, and explode with greater force than the previously known varieties of basic lead styphnate.

Yellow basic lead styphnate, as heretofore available, has been disadvantageous for commercial use because of certain deficiencies, and particularly because of its bulky character both in the moist and dry conditions. Its tendency to settle very slowly from aqueous suspension to yield finally a substrate which still contains 80–90% water, not only renders difficult the necessary washing treatments during manufacture, but also necessitates the use of undesirable filtering operations if the product is desired at sufficiently high solids' content to be capable of formulation in wet-mixed explosive compositions containing 10–20% of water or other desensitizing liquid, such as are used, for example, in priming small caliber rim-fire cartridges. Gravity filtration is generally slow, while suction filtration of explosive salts is fraught with danger because of the possibility of drying portions of the filter cake during the operation. Even when the material is obtained at sufficiently high solids' content, as by suction filtration and/or evaporation of part of the residual water, compositions formulated therewith are of a rubbery consistency rather than of the smooth pasty quality essential for the ready handling, charging, and spinning of the mixture into such cartridges.

It is not possible to overcome the above-mentioned deficiencies by modifying the manufacturing process so as merely to increase the size of the individual particles of the precipitate, since treatments having this purpose, such as extended agitation in hot aqueous solution or precipitation in the presence of a solvent for the precipitate, result in elongated needle crystals in which the length is approximately ten or more times the width and which retain the unfavorable handling characteristics of the smaller sized particles. The red crystalline form, possibly due to the diamond shape of its crystals, displays bulkiness in the dry state, causing decreased explosive force and/or sensitivity in certain compositions. In contrast with these prior types, the basic lead styphnate provided by the present invention is of such crystal structure that it not only settles rapidly from aqueous suspension to yield a substrate containing 70–80% solids, so that its preparation for use in wet-mixed compositions involves only the decantation of supernatant liquid, but it also packs to a high apparent density in the solid state, so that its sensitivity and explosive power are unimpaired in dry-mixed compositions.

Basic lead styphnate having this new structure may be conveniently and economically manufactured by preparing a slightly acidic solution of a styphnate, which also contains an agent for controlling the crystallization of the subsequent precipitate, and then, simultaneously adding to the same at a suitable temperature, generally between 60° and 80° C., solutions of a lead salt and of ammonium hydroxide at controlled rates, the amounts being close to the theoretical required for the reaction. Among suitable crystallization controlling agents there may be listed nitrosation and nitrosation-nitration products of resorcinol, such as dinitrosoresorcinol, nitroresorufin, nitroresazurin, and mixtures of the same. Likewise any other substance having the property of desirably controlling the crystal form of the precipitate may be employed in the process. The presence of such an agent is essential for the obtainment of the desirable form of crystalline precipitate, this result being secured probably by reason of the preferential adsorption of the agent or the lead salt thereof on certain faces of the crystals as they form in the reaction mixture, causing a decreased rate of growth of the crystals in a direction perpendicular to such faces. In the absence of such an agent, needle-shaped crystals, having undesirable settling and handling properties, are obtained. Generally, it is desirable to have present in the solution a solvent for the basic lead styphnate, such as ammonium acetate, with or without sodium chloride or sodium acetate. The presence of a solvent material enables the production of larger sized crystals than are obtained when such a substance is not employed.

The following specific example typifies a preferred procedure for the precipitation, starting with 272.7 grams of pure styphnic acid,

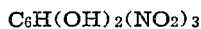

having a pale yellow color and a melting point of 175° C. (corrected). The styphnic acid is placed in a suitable container, such as a stainless steel bucket, and 3600 c. c. of water are added. The container is placed in a suitable heating bath and the temperature is raised to 62-65° C., during agitation. A suitable amount of a crystallization controlling agent is then added, for example, 4.5 grams of the deep brown solid containing about 10.6% nitrogen, 2.2% hydrogen, and 39.9% carbon, formed by consecutive nitrosation and nitration of resorcinol, as follows:

330 g. of resorcinol are dissolved in 1000 c. c. of water, and the solution is boiled gently for one hour after the addition thereto of 420 g. of sodium nitrite. The resulting blue solution is cooled and slowly added to a mixture of 1200 c. c. of concentrated nitric acid (sp. gr. 1.42) and 2250 g. of crushed ice. This mixture is warmed to 30° C. until effervescence of gas has nearly ceased, whereupon it is heated to 70° C. and then, after cooling to room temperature, it is filtered by suction. The precipitate is washed till the effluent is neutral to litmus, and is finally dried at 50° C. and powdered.

After several minutes' agitation of the suspension of styphnic acid and crystallization controlling agent, 119.7 c. c. of glacial acetic acid are added, followed by the addition of 280 c. c. of an ammonium hydroxide solution, containing 255 g. of $NH_3$ per liter. The resulting clear solution, which should have a pH between 5.5 and 6.5 measured at 25° C. with a quinhydrone electrode, is heated to 68-70° C., agitation being continued, and the addition thereto of a solution of 729 g. of lead nitrate in 2700 c. c. of water is started at a uniform rate such that the total addition time will be 34 minutes. Three minutes after starting the addition of the lead nitrate, the addition of a solution, formed by dissolving 153 c. c. of ammonium hydroxide (containing 255 g. of ammonia per liter) in 1175 c. c. of water, is initiated at a uniform rate such that its addition is completed in 16 minutes. The amounts of the lead salt and ammonium hydroxide are close to the theoretical quantities required for the precipitation, the former being in slight deficiency and the latter in slight excess to insure alkalinity of the final reaction mixture. Agitation is continued at 68-70° C. for a period of 25 minutes after the lead nitrate solution has all been added. The initial precipitation is in the form of finely divided particles and the final crystalline form is not apparent until about 15 minutes after the start of addition of the lead nitrate solution. Conversion of substantially all the precipitate to the desired crystals is complete about ten minutes after all the lead nitrate has been added. Agitation and heating are discontinued, the precipitate is allowed to settle for 10 to 20 minutes, and the supernatant liquid is decanted while hot. Washing of the precipitate is then conveniently effected by suspending the same in 5-6 liters of water containing 5-6 g. of lead nitrate, allowing the precipitate to settle for 10 to 20 minutes, and pouring off the supernatant liquid. For thorough washing, this procedure may be repeated four times, the final treatment being with pure water.

The use of this convenient washing procedure is made possible by the ability of the precipitate to settle rapidly from suspension to give a substrate containing only 20-30% of liquid. The product consists of about 590 grams of basic lead styphnate in the form of yellow to tan-yellow substantially rectangular parallelopiped crystals which on the average are 0.02-0.3 mm. long, 0.01-0.015 mm. wide, and about 0.003-0.004 mm. thick. The crystals when viewed by reflected light are colored a tan-yellow; the tannish tinge is probably due to the presence of the dark-colored crystallization controlling agent and would presumably be absent if a colorless or light-colored agent were used. When viewed with transmitted light under a microscope, the crystals prepared as described above are transparent and light yellow in color. Analysis has indicated a lead content of 59.98% on the average.

The above described procedure has been found to yield excellent results; however, variations are permissible when suitable compensation is made by changing one or more of the other variables. Thus, for given rates of addition of the solutions, a slight deficiency in the amount of the crystallization controlling agent may be compensated for by increasing somewhat the quantity of ammonium hydroxide initially present in the styphnate solution, while a slight excess may be offset by decreasing the ammonium hydroxide. The optimum quantity of any particular agent for use may readily be determined by carrying out a series of small scale precipitations using various amounts of the agent. If it is found convenient to add the ammonium hydroxide solution somewhat more rapidly, this change may be carried out by decreasing the amount of this reagent initially present in the styphnate solution and/or increasing the rate of addition of the solution of the lead salt. Likewise, with a given rate of addition of the ammonium hydroxide solution, an increase in the rate of addition of the solution of lead salt may be made, provided more ammonium hydroxide is initially present in the styphnate solution. The rates of addition of both the added solution may be raised when higher concentrations are employed. As further modification of the procedure, other suitable salts may be substituted for those specifically mentioned; for example, lead nitrate may be replaced by an equivalent amount of another lead salt such as lead acetate, while ammonium styphnate may be replaced by another inorganic styphnate, such as the sodium or magnesium salt, or by the styphnate of an organic base, such as morpholine or an ethanolamine.

Smaller orthorhombic crystals, of the same general form as those described above, may be obtained, if desired, by making one or more of the following changes in the above-described procedure: increasing the proportion of crystallization controlling agent, lowering the temperature at which the precipitation is carried out, decreasing the amount of solvent for basic lead styphnate, or increasing the quantity of ammonium hydroxide added.

By initially dissolving 90-130 g. of sodium chloride in the ammonium styphnate solution in the above-described specific example, it was found possible to increase the size of the resulting crystals to an average length of 0.035-0.045 mm. and average width of 0.02-0.035 mm., some crystals having a length of 0.06 mm.

An X-ray study of oriented crystals of this new basic lead styphnate has shown that it belongs to the orthorhombic system. The simplest unit cell derived from the X-ray measurements contains four molecules and has dimensions of 8.16±0.15, 8.24±0.15, and 18.27±0.30 Å. U. Generally, the crystals contain only the pinacoidal faces, the basal-pinacoidal (001; Miller indices) being the most prominent face. When examined under crossed Nicols, with the light rays perpendicular to this face, the crystals show parallel extinction. It will be understood, however, that other orthorhombic crystal habits, including forms having dome, prism, and pyramid faces, may at times occur in the product, particularly as slight modifications of the pinacoidal crystals.

The new crystalline basic lead styphnate is also readily obtainable from styphnic acid which is colored a dark chocolate brown by the presence of certain impurities. This type of styphnic acid results when in the course of its manufacture from resorcinol by successive sulfonation and nitration, the presence of oxides of nitrogen in the sulfonating solution is provided for by the addition of spent nitrating acid, sodium nitrite, or of the oxides thereto. The highly colored impurities consist of products or mixtures of products derived from resorcinol by nitrosation and nitration, and are effective crystallization controlling agents for basic lead styphnate. A small scale precipitation experiment according to the above specific example, but using no added agent, will serve readily to show whether or not any particular lot of styphnic acid contains a suitable amount of controlling agent. If an excess is present, the styphnic acid may be mixed with a sufficient amount of pale yellow styphnic acid so that the correct ratio of agent is provided, while in the event of a deficiency, the necessary additional amount may be added. The precipitation may then be carried out as described above.

Physical and explosive properties of the orthorhombic crystals of this invention, of the red diamond crystalline form, and of the yellow "amorphous" variety of basic lead styphnate, the latter two being prepared according to U. S. Patent 1,942,274 to Brun and U. S. Patent 2,020,665 to Tauson respectively, are listed in Table I. Details concerning the determinations are given following the table.

TABLE I.—*Properties of basic lead styphnates*

| | Orthorhombic crystals (this invention) | Red diamond crystals (U. S. 1,942,274) | Yellow "amorphous" (U. S. 2,020,665) |
|---|---|---|---|
| Specific gravity $\frac{30° C}{30° C}$ | 4.05 | 4.12 | 4.13. |
| Apparent density of dry solid, g./cc. | 1.67 | 0.59 | 1.0. |
| Principal interplanar distances in crystals, determined from X-ray powder diagrams, and given in Angstrom units. Starred values represent interplanar distances corresponding to the most intense lines in the diagram; unstarred values correspond to less intense lines, while those marked *f* correspond to lines fainter than the latter. | Absent | 3.61*f* | 3.63*f*. |
| | ---do--- | Absent | 3.40*f*. |
| | 3.27*f* | 3.25*f* | 3.28*f*. |
| | Absent | Absent | 3.13*f*. |
| | 2.98* | 3.00*f* | 2.99*f*. |
| | Absent | Absent | 2.88*f*. |
| | 2.69* | ---do--- | Absent. |
| | Absent | 2.62 | Do. |
| | ---do--- | Absent | 2.52*f*. |
| | 2.37 | 2.38*f* | 2.39*f*. |
| | Absent | 2.10 | Absent. |
| | 1.95* | 1.98*f* | Do. |
| | 1.62* | Absent | Do. |
| | 1.605 | ---do--- | Do. |
| | 1.595 | ---do--- | Do. |
| Sensitivity to frictional impact: | | | |
| No. of tests | 350 | 350 | 50. |
| No. firing | 295 | 233 | 12. |
| No. misfiring | 55 | 117 | 38. |

The densities were measured relative to water by means of a pycnometer, using samples which had been maintained wet with water following their precipitation. This precaution was taken because of the observation that dry samples at times gave low values apparently due to adsorption or occlusion of air, which was not displaced on re-wetting with water.

Apparent densities were measured by pouring 1.0 gram of dry material into a glass tube, tapping the tube lightly, and measuring the volume. The dry salts were prepared by successive washing of the water-wet materials with alcohol and then ether on a suction filter, followed by air drying at below 50° C. Normal lead styphnate was found to have an apparent density of 1.12 by this method.

The X-ray powder diagrams were obtained with the use of copper radiation having an effective wave length of 1.54 Å. U. The interplanar distances listed, which are accurate to within 0.01 Å. U., show conclusively that the orthorhombic basic lead styphnate of this invention differs structurally from the other varieties.

The pendulum sensitivity test furnishes a measure of the sensitivity to frictional impact of an explosive and was carried out with apparatus similar to that described by Taylor and Rinkenbach, Journal of Franklin Institute, pages 369–376, September, 1927. A pendulum, twenty inches in overall length and consisting of a rod weighing 133 g. and a steel shoe weighing 364 g., was used. The point of suspension was so adjusted that the swinging bob just grazed the surface of a steel plate fastened at the point of rest of the pendulum. In making a test, a sample of dry explosive was placed at the center of the plate and the pendulum allowed to swing freely from a point 26 inches therefrom, measured along the arc traversed by the bottom surface of the bob. The comparative data listed in the table were obtained by successive alternated five- or ten-shot series of the explosives, the observations of different operators being in close agreement. The basic lead styphnate of this invention was shown to be appreciably more sensitive to frictional impact than the others, and its explosion noticeably louder.

Comparison of the explosive force of the basic lead styphnates was made by means of the sand bomb test. Equal weights of the salts were similarly compressed into metal blasting caps, which were placed in the bomb with 200 grams of sand and fired by means of a safety fuse. The basic lead styphnate of this invention consistently crushed more sand and also shattered the metal cap more completely in these tests, its explosion being thus indicated to be more forceful than that of the other varieties.

The fact that the new basic lead styphnate is more appreciably and satisfactorily desensitized against explosion by the presence of 15% of water than the red crystalline variety was shown by a test for detonation under confinement. One gram of the explosive under test, containing 0.177 gram of water, was placed in a glass vial, a metal blasting cap, containing one gram of dry normal lead styphnate and provided with a length of safety fuse, was imbedded in the moist explosive, so that the base of the cap was in contact with the bottom of the vial, and the assembly was enclosed in a steel bomb. The normal lead styphnate was then exploded by lighting the fuse. The extent of explosion of the moist explosive under test could be ascertained by noting the appearance of the residue and the extent of fragmentation of the metal cap after the bomb was disassembled, and particularly by noting the effect of dropping the residue on a hot plate at a temperature above 400° C. With the basic lead styphnate of this invention, the crystals were apparent in the residue, which also exploded forcefully on the hot plate, and the upper half of the blasting cap remained intact, while with the other variety tested, the fact that the water-wet sample had detonated during the test was indicated by the weakness or absence of explosion when the residue was placed on the hot plate, as well as by the absence of crystals in the residue, and by the fact that the blasting cap had been entirely fragmented.

The new basic lead styphnate successfully withstands the known tests for safety in handling; for example, when the flame from a safety fuse is directed on a mass of the material which is wet with as little as 10% of its weight of water, there results merely a blackening of the surface exposed to the flame, and no explosion or deflagration occurs.

The chemical stability is excellent, so that marked resistance to change in the sensitivity and explosive power is displayed during extended storage, even under adverse conditions, such as 74° C. and 90% relative humidity. The new explosive is therefore well qualified by reason of its stability and explosive, physical, and handling properties for use in explosive compositions, such as priming mixtures for ammunition. For such use, it may be used as the sole initiating explosive, or in combination with one or more of known explosives such as mercury fulminate, lead azide, basic lead azide, normal and basic lead picrate, normal lead styphnate, and diazodinitrophenol. An oxidizing ingredient such as barium nitrate, lead nitrate, lead dioxide, lead chromate, barium peroxide, or potassium nitrate or permanganate is generally advantageous in amounts up to thirty or thirty-five percent of the composition for reaction with one or more fuel components of the type of antimony sulfide, calcium silicide, lead thiocyanate, and ferrosilicon. Explosive fuels such as lead dinitrosoresorcinate, described and claimed in the copending application, Serial No. 105,289, filed October 12, 1936, to Kerone and Carroll, now U. S. Patent No. 2,177,657 may likewise be of advantage. The priming mixture may also contain up to about twenty-five percent of an abrasive such as glass and a suitable binding agent, such as gum arabic, according to the type of ammunition and the requirements for which it is intended.

In a typical priming composition for rim-fire cartridges, which fulfills all commercial requirements such as of sensitivity, stability, and igniting power, forty-five to fifty-five parts by weight of the basic lead styphnate of this invention are mixed with two to ten parts of normal lead dinitrosoresorcinate, fifteen to twenty-five parts of glass of suitable type and granulation, twenty-five to thirty-five parts of lead or barium nitrate, and one part of gum arabic. Preferably, the explosives, moistened with water, are first mixed, the remaining ingredients added dry, and the whole thoroughly mixed. The wet mixture is loaded into cartridges and spun into the rim cavities thereof according to well known methods. After drying, the shells may be loaded with the propellent charge, and the bullets inserted and crimped in place.

A dry-mixed primer composition typifying a further application of the new explosive consists of fifteen to twenty-five parts thereof, ten to twenty-five parts of mercury fulminate, twenty to thirty parts of a fuel such as antimony sulfide, and thirty to forty parts of an oxidizing agent such as the double salt of barium and potassium nitrate. The mercury fulminate may be replaced in whole or in part in the above composition by either or both diazodinitrophenol and normal lead styphnate, while the antimony sulfide may be replaced in whole or in part by either or both normal lead dinitrosoresorcinate and calcium silicide or similar fuel, and at times the addition of a suitable abrasive may be desirable for increased sensitivity.

The basic lead styphnate of this invention, being characterized by a comparatively low instantaneous ignition temperature, 344° C. (determined by means of a Dennis heated bar melting point apparatus), and an ignition current, of 0.32 ampere, is admirably adapted for use in the ignition composition of electric blasting caps and igniters. In such use, it may be employed alone or in combination with an oxidizing agent such as potassium chlorate. It may likewise have admixed thereto another explosive such as diazodinitrophenol.

In the appended claims, the term "tabular crystals," in accordance with the definition on page 26 of Winchell's "The Microscopic Characters of Artificial Inorganic Solid Substances or Artificial Minerals," (1931), refers to crystals in which a pair of opposite faces is decidedly larger than the other faces. Where crystal shapes are defined in the claims by the terms "rectangular parallelopiped" and "pinacoidal," these are intended to refer to the principal characteristics of the crystals and not to be construed as excluding the presence of additional faces at the corners and edges thereof.

We claim:

1. As a new product, yellow basic lead styphnate in the form of tabular rectangular parallelopiped crystals.

2. As a new product, yellow basic lead styphnate in the form of tabular rectangular parallelopiped crystals averaging 0.02 to 0.03 millimeter in length and 0.01 to 0.015 millimeter in width.

3. As a new product, basic lead styphnate in the form of rectangular parallelopiped crystals averaging 0.035 to 0.045 millimeter in length and 0.02 to 0.035 millimeter in width.

4. As a new product, yellow basic lead styphnate in the form of orthorhombic crystals having principal interplanar distances of substantially 2.98, 2.69, and 1.95 Ångstrom units, corresponding to the most intense lines of an X-ray powder diffraction diagram.

5. As a new product, yellow basic lead styphnate in the form of orthorhombic crystals in which the simplest unit cell contains four molecules and has dimensions of substantially 8.16 x 8.24 x 18.27 Ångstrom units.

6. As a new product, yellow basic lead styphnate in the form of tabular orthorhombic pinacoidal crystals.

7. As a new product, yellow basic lead styphnate in the form of tabular orthorhombic crystals, characterized by prominent basal-pinacoidal faces.

8. As a new product, yellow basic lead styphnate in the form of tabular crystals having an apparent density of about 1.67 grams per cubic centimeter in the uncompressed dry state.

9. The process of manufacturing basic lead styphnate comprising preparing an aqueous solution containing a soluble styphnate and an agent for controlling the crystallization of basic lead styphnate, adjusting the pH of the solution to between 5.5 and 6.5 as measured at 25° C., and simultaneously adding thereto a solution of a lead salt and a solution of ammonium hydroxide.

10. The process of manufacturing basic lead styphnate comprising preparing an aqueous solution containing a soluble styphnate, a solvent for basic lead styphnate, and an agent for controlling the crystallization of basic lead styphnate, adjusting the pH of the solution to between 5.5 and 6.5 as measured at 25° C., and simultaneously adding thereto a solution of a lead salt and a solution of ammonium hydroxide.

11. The process of manufacturing basic lead styphnate comprising preparing an aqueous solution containing a soluble styphnate, ammonium acetate, and an agent for controlling the crystallization of basic lead styphnate, adjusting the pH of the solution to between 5.5 and 6.5 as measured at 25° C., heating the solution to a temperature of 60° to 80° C., and simultaneously adding thereto during agitation a solution of a lead salt and a solution of ammonium hydroxide.

12. The process of manufacturing basic lead styphnate comprising preparing an aqueous solution containing a soluble styphnate and an agent for controlling the crystallization of basic lead styphnate consisting of a product formed by the successive nitrosation and nitration of resorcinol, adjusting the pH of the solution to between 5.5 and 6.5 as measured at 25° C., and simultaneously adding thereto a solution of a lead salt and a solution of ammonium hydroxide.

AARON L. HITCHENS, JR.
FREDERICK M. GARFIELD.